June 17, 1947.   J. A. PIERCE ET AL   2,422,499
ALUMINA GEL
Filed Feb. 16, 1944
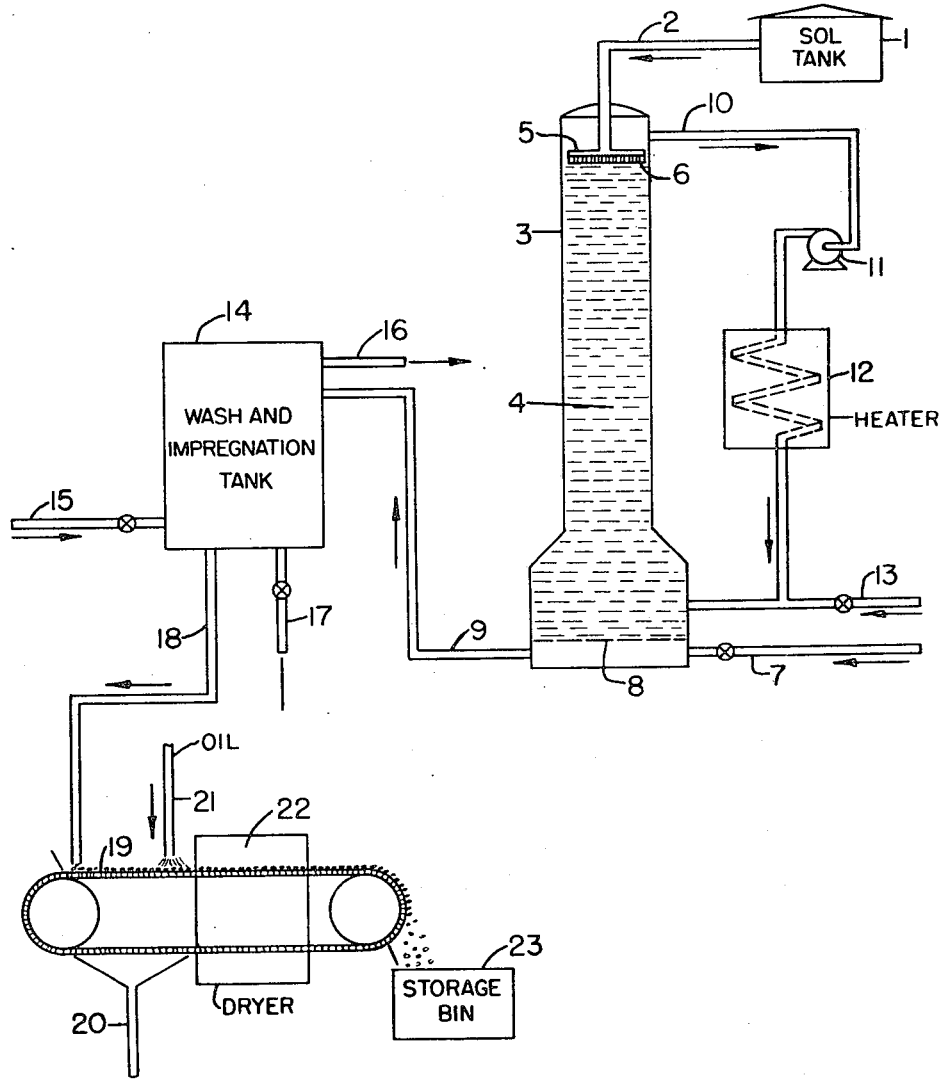
Jerry A. Pierce
Charles N. Kimberlin Jr.   INVENTORS
BY　　　　ATTORNEY Patented June 17, 1947

2,422,499

UNITED STATES PATENT OFFICE 2,422,499

ALUMINA GEL

Jerry A. Pierce and Charles N. Kimberlin, Jr., Baton Rouge, La., assignors to Standard Oil Development Company, a corporation of Delaware Application February 16, 1944, Serial No. 522,564

4 Claims. (Cl. 23—143)

The present invention relates to the art of producing adsorbent gels in spherical form and especially in large sizes from about 0.25 mm. up to about 5 mm. in diameter. These materials are cheaply prepared by the present method and are very useful for the adsorption of vapors and for catalytic purposes. The invention will be fully understood from the following description and the drawing.

In the accompanying drawing we have shown a diagrammatic view in sectional elevation, illustrating an apparatus for continuous production of gel particles in spherical form.

Inorganic gels are well known and have been long used for various purposes, for example, for the adsorption of condensible vapors from gaseous carriers and for catalytic purposes either as the catalyst itself or as a component thereof or a carrier. Silica gel is the best known and the most widely used, but other gels such as those of alumina are also useful. Simple gels may be used alone or after impregnation with catalytic materials or, if desired, plural gels such as silica-alumina gels may also be used. The present invention deals with the preparation of such gels which can be used for any of the above mentioned purposes either as simple gels or various mixtures. The present methods are capable of producing gel particles in remarkably uniform spherical shapes which are particularly desirable for industrial uses and have many advantages over the irregularly shaped particles ordinarily produced by grinding the larger gel aggregates.

Referring to the drawing, numeral 1 is a storage tank in which a sol of the desired gel is prepared. The methods for the preparation of these sols need not be described in detail here because the methods themselves are well known in the art and certain illustrative details will be furnished in the examples attached hereto. Suffice it to say that all of the well known techniques may be employed and concentration, proportion of ingredients, pH of the sols and other factors are adjusted so as to prepare hydrogels which will set firmly rather rapidly, say in one-quarter to one-half hour, more or less. The sol is taken from tank 1 and is fed through a pipe 2 into the top of tower 3 which is filled with viscous water-immiscible liquid indicated generally at 4. The sol is discharged, preferably just below the surface of the viscous medium through a distributor head 5, which is fitted with a plurality of orifices 6 which may vary in diameter from $\frac{1}{16}$ to $\frac{1}{4}$ in. but preferably are about $\frac{1}{8}$ in.

The liquid should have a density slightly less than that of water but at the same time the liquid should be viscous enough to avoid too fast dropping of the sol particles as this will tend to cause flattening of the particles. Suitable liquids that can be used for this purpose are kerosene, heavy naphtha, light gas oil, lubricating oils, coal tar oils such as xylol, etc. The flow through the orifice may be controlled through wide limits. If uniform sized spherical particles are desired it will be necessary to control the flow through the orifice so that the sol emerges in droplets which grow to a pre-formed size and then break away from the tip. However, this is usually not desirable since it is generally too slow and uniform sized spheres are not necessary as a rule. The size of the orifice and rate of feed may therefore be controlled so that the sol flows in a steady stream into the oil where, due to its higher density, it settles slowly through the column of oil and at the same time breaks up into spherical particles.

Water or other aqueous liquid, such as aqueous alcohol, is forced into the lower part of the tower 3 by pipe 7 so that a layer thereof is accumulated in the lower portion of the tower with an oil-water interface maintained as indicated at the level 8. The sol globules are given time in passing down through the column 4 to harden into hydrogels and they have no difficulty in passing through the interface at 8 and into the aqueous phase since hydrogels are found to be considerably more easily wet by water than by the oil. A slurry of water containing spherical particles of hydrogel is then removed from the lower part of the tower in a flowing stream which emerges through pipe 9. Returning to the tower 3, provision is made for maintaining it at a desired temperature most suitable for gelation of the particular sol employed. For example silica sol gels most readily at temperatures up to 212° F., the sol setting more rapidly as the temperature is increased. Oil may be drawn off at the upper end of the tower by a pipe 10 and circulated to the bottom by a pump 11 by way of a heater or other means in which temperature may be properly adjusted. In the case of certain gels, it is desirable to shift the pH from the value in the sol so as to induce gelling and basic materials such as morpholine may be added to the oil as by the pipe 13 just prior to its introduction into the column 3. This basic material will then be transferred to the sol during the descent of the sol through the oil.

The hydrogel particles removed through line 9 contain a certain amount of occluded salts which were produced during preparation of the sol. These salts should be removed prior to impregnating the hydrogel with catalytic materials. For this purpose the hydrogel particles removed through line 9 are introduced into tank 14 where they are contacted with water continuously introduced through line 15 and removed through line 16. After all the salts have been washed out in this manner the supply of water is discontinued and the water remaining in tank 14 is drained off through line 17.

If it is decided at this time to impregnate the hydrogel with metallic salts for catalytic purposes a solution of the desired salt is introduced through line 15 and the excess removed through line 16.

This may be followed by a "fixing" solution if desired. For example in the preparation of alumina-impregnated catalysts it is often desirable to impregnate the gel with aluminum sulfate and then treat the impregnated hydrogel with ammonia to "fix" the alumina and then rewash to remove the ammonia. As soon as the hydrogel has been impregnated to the desired extent the solution in tank 14 is drawn off through line 17 and the hydrogel is transferred by line 18 to a moving endless belt screen 19 and any water separating from the hydrogel particles passes through the screen and is removed through line 20.

The hydrogel particles are now ready for final drying but care must be taken to prevent the spheres from decrepitating during the drying step. For this purpose it is desirable to spray oil over the surface of the hydrogel particles. This oil may be introduced onto the hydrogel particles through line 21 so as to coat them with a thin film of oil while still on screen 19. The screen is then passed into drier 22 maintained at a temperature between 90 and 120° F. where the spherical particles are dried in the presence of the oil film. The dried gel particles are then discharged from the screen 19 into storage bin 23.

Many variations can be made in the above process which may occur to anyone skilled in the art. For example instead of flowing the sol downwardly through an oil having a density slightly less than that of the sol, the sol may be introduced at the bottom of a column of oil which has a density slightly higher than that of the sol so that sol will be caused to pass upwardly through the oil.

Any suitable substance having a density higher than that of the oil and having a suitable viscosity may be used; for example oil of mirbane is suitable for this purpose. However it is usually more convenient to use on oil the density of which has been raised above that of the sol. An oil of this character may be prepared by adding to a lubricating oil small amounts of high density materials such as carbon tetrachloride, dibromoethane, acetylene tetrabromide, etc.

The essential features of the present process are to prepare a sol and disperse it in droplets of the desired size in a non-aqueous oily liquid which is maintained in a relatively quiescent condition so that the droplets are permitted to harden into a firm hydrogel while suspended in the liquid.

It is most convenient to prepare hydrogels which will set at ordinary temperatures in 15 to 45 minutes but which will set within one to two minutes at the temperature of the column. If the sol is of such a type that it requires a longer time at ordinary temperatures, say 2 hours, to set, it is desirable to wait until all but a few minutes of the setting time has elapsed and then introduce it into the column of oil so that the setting time in the column is only that of the actual setting time remaining. The height of the column is adjusted so that the hardening will take place in the time necessary for the particles to pass through the column. The time of passage is a function of the viscosity of the oil and the difference in the densities between the oily liquid and the particles, and the size of the drops.

Viscosity can be adjusted to some extent by selection of the oil employed and a considerable variety or range is presented by the use of hydrocarbon oils which range from naphthas of very low viscosity to light and heavy lubricating oils of considerably greater viscosity. The adjustment of temperature increases the rate of gelation and at the same time varies the viscosity of the medium in which the gel particles are suspended. In general the oil in the column is maintained in a relatively quiescent state so as to maintain the gel particles in the desired size, but there generally is a slow flow through the column and this gives an additional means for controlling the time in which the droplets are exposed to gelling conditions. There should be no turbulence, but nevertheless flow can be maintained so as to control the time within the gelling zone as long as desired. All of these factors are readily adjusted or inter-adjusted in order to obtain a firm hydrogel at the discharge end of column 3.

It is also within the scope of this invention to carry out the process described in a batch rather than a continuous manner. For example the sol may be dropped into pans containing oil of about the same density as the sol. In this case the sol will remain suspended beneath the surface of the oil for as long a period as desired. In this way advantage can be taken of the phenomenon of synaeresis (that is the shrinking of the gel structure with removal of the entrapped aqueous liquid) to harden the hydrogel.

The products prepared by the present methods are globules of nearly perfect spherical form and remarkably uniform in size. The diameter of the particles can be controlled by the various factors mentioned above quite easily between the ranges of about 0.5 and 10 mm. in the hydrogel state which dry to gel particles having diameters between 0.25 and 5 mm. Such materials have many industrial uses.

The following experiments are given to indicate in general the preparation of the gels according to this invention and while they are illustrative they are not given with the intent of limiting the scope of the invention to the specific instances presented.

*Example 1*

A 25° Bé. solution of sodium silicate was prepared by diluting 40° Bé. commercial material with water. A solution of sulfuric acid was prepared by adding 1.84 specific gravity sulfuric acid to water so that the solution represents approximately a 29% by volume mixture. The two solutions are cooled to room temperature and the density checked by means of hydrometers. The density of a properly mixed sol was also determined and found to be 1.21.

Dibromo-ethane was added to a lubricating oil until an intimate mixture was found to have a density practically the same as that of the sol, i. e. 1.21. The oil was poured into shallow pans.

A sol was prepared by pouring into 90 cc. of the acid solution 100 cc. of the silicate solution. The sol was then sprinkled into the oil through perforations. It was found that setting started within five minutes, that soft hydrogel spheres formed in ten minutes and that they were firm enough to be removed at the end of half an hour.

The spheres were removed to water and were washed by continuous decantation over night. The wash water was then found to contain no traces of sulfate ion by chemical test. The spheres were covered with a film of lubricating oil and allowed to dry slowly at a moderate temperature (90–100° F.). They were then removed to a muffle furnace where the temperature was slowly raised to 900° F. At the end of three hours the spheres were freed of their oily coating and were hard and porous.

Example 2

A sodium silicate solution was prepared by mixing 150 grams of 40° Bé. solution silicate and 850 grams of water. An acid solution was made by mixing 150 grams of 38.6% hydrochloric acid with 850 grams of water.

A sol was prepared by adding to 25 cc. of this acid 90 cc. of this silicate solution. The sol was immediately poured into the apparatus described in this application and illustrated in the drawing. Firm hydrogel spheres emerged from the discharge end of the apparatus, were recovered, washed and dried by previously described methods. The setting time of this sol is approximately four minutes at room temperatures.

Example 3

An alumina sol produced by any known method, and containing approximately 5% by weight of alumina ($Al_2O_3$) may be dropped into an oil similar to that described in Example 1 but to which has been added a sufficient amount of an organic base, such as morpholine, to shift the pH of the alumina sol to the alkaline side. The alumina macrospheres set almost instantly and can be removed after a short time and dried by proper methods. No washing is necessary as no harmful impurities are included with the sphere.

Example 4

100 cc. of sodium silicate solution (1.21 sp. gr.) is diluted with 25 cc. of water and is added with vigorous stirring to 100 cc. of 4 normal acetic acid. At room temperature (75° F.) this sol will set to a firm hydrogel in 25 minutes. The sol was introduced into the column illustrated in the drawing in which the oil was maintained at 200–212° F. Firm hydrogel spheres were produced. The spheres formed from this sol are hard and firm and can be dried in the air at moderate temperatures and then ignited at much higher temperatures with less than 2% of broken pieces. The dried particles are unusually hard and are highly adsorbent. Previous to drying they may be impregnated with alumina or other suitable catalytic materials.

Example 5

Spherical hydrogel particles as produced in Examples 1, 2 or 4 may, before being dried, be soaked in a solution of some metallic salt until the solution has completely penetrated the hydrogel particles. The impregnating salt may then be set by soaking the material in a weak ammonia solution, and then washing and drying as above described. The amount of impregnant is decided by the manner in which the dried material is to be used.

The nature and objects of the present invention having thus been set forth and specific examples illustrative of the same given, what is claimed as new and useful and desired to be secured by Letters Patent is:

1. An improved process for producing substantially spherical particles of alumina gel which comprises preparing an alumina sol, suspending droplets of the alumina sol of the desired size in a viscous organic water-immiscible inert liquid having dissolved therein an organic base non-reactive with said liquid and in sufficient quantities to change pH and induce gelation and maintaining the droplets in a relatively quiescent state in suspension and out of direct contact with each other for a period of time until the alumina sol has set to a hydrogel, then separating the hydrogel particles from viscous liquid, washing the particles and drying the same.

2. Process according to claim 1 in which the organic base is morpholine.

3. A process according to claim 1 in which the water-immiscible liquid is petroleum oil.

4. A process according to claim 1 in which the water-immiscible liquid is petroleum oil and the organic base is morpholine.

JERRY A. PIERCE.
CHARLES N. KIMBERLIN, JR.

REFERENCES CITED

The following references are of record in the file of this patent:

UNITED STATES PATENTS

| Number | Name | Date |
|---|---|---|
| 2,284,248 | Baker, et al. | May 26, 1942 |
| 1,614,636 | Wachtel | Jan. 18, 1927 |
| 2,384,946 | Maristic | Sept. 18, 1945 |
| 2,385,217 | Maristic | Sept. 18, 1945 |

OTHER REFERENCES

Mellor, Inorganic Chemistry, vol. VI (1925), p. 291. (Copy in Div. 59.)